United States Patent
Redert

(10) Patent No.: US 7,167,188 B2
(45) Date of Patent: Jan. 23, 2007

(54) METHOD OF AND SCALING UNIT FOR SCALING A THREE-DIMENSIONAL MODEL AND DISPLAY APPARATUS

(75) Inventor: Peter-Andre Redert, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 230 days.

(21) Appl. No.: 10/500,550

(22) PCT Filed: Dec. 9, 2002

(86) PCT No.: PCT/IB02/05369

§ 371 (c)(1),
(2), (4) Date: Jul. 1, 2004

(87) PCT Pub. No.: WO03/058556

PCT Pub. Date: Jul. 17, 2003

(65) Prior Publication Data

US 2005/0093892 A1 May 5, 2005

(30) Foreign Application Priority Data

Jan. 7, 2002 (EP) ................... 02075025

(51) Int. Cl.
*G06T 17/00* (2006.01)
*G06T 17/40* (2006.01)

(52) U.S. Cl. ................................... 345/660
(58) Field of Classification Search ............... None
See application file for complete search history.

(56) References Cited

U.S. PATENT DOCUMENTS

| | | | |
|---|---|---|---|
| 6,417,850 B1 * | 7/2002 | Kang | 345/422 |
| 6,636,228 B1 * | 10/2003 | Morton et al. | 345/589 |
| 6,842,175 B1 * | 1/2005 | Schmalstieg et al. | 345/427 |
| 2002/0113752 A1 * | 8/2002 | Sullivan et al. | 345/6 |
| 2003/0067476 A1 * | 4/2003 | Miller et al. | 345/598 |

* cited by examiner

*Primary Examiner*—Mark Zimmerman
*Assistant Examiner*—Andrew Yang
(74) *Attorney, Agent, or Firm*—Larry Liberchuk

(57) ABSTRACT

A method of scaling a three-dimensional model (100) into a scaled three-dimensional model (108) in a dimension which is related with depth which method is based on properties of human visual perception. The method is based on discrimination or distinguishing between relevant parts of the information represented by the three-dimensional model for which the human visual perception is sensitive and in irrelevant parts of the information represented by the three-dimensional model for which the human visual perception is insensitive. Properties of the human visual perception are e.g. sensitivity to a discontinuity in a signal representing depth and sensitivity to a difference of luminance values between neighboring pixels of a two-dimensional view of the three-dimensional model.

9 Claims, 4 Drawing Sheets

METHOD OF AND SCALING UNIT FOR SCALING A THREE-DIMENSIONAL MODEL AND DISPLAY APPARATUS

FIELD OF THE INVENTION

The invention relates to a method of scaling a three-dimensional model into a scaled three-dimensional model in a dimension which corresponds to a viewing direction of a viewer towards the three-dimensional model.

The invention further relates to a scaling unit for scaling a three-dimensional model into a scaled three-dimensional model in a dimension which corresponds to a viewing direction of a viewer towards the three-dimensional model.

The invention further relates to an image display apparatus comprising:
  receiving means for receiving a signal representing a three-dimensional model;
  a scaling unit for scaling the three-dimensional model into a scaled three-dimensional model in a dimension which corresponds to a viewing direction of a viewer towards the three-dimensional model; and
  display means for visualizing a view of the scaled three-dimensional model.

BACKGROUND OF THE INVENTION

The probability that the size of a three-dimensional scene does not match with the display capabilities of an image display apparatus is high. Hence, a scaling operation is eminent. Other reasons why scaling might be required is to adapt the geometry of the three-dimensional model representing the three-dimensional scene to a transmission channel or to adapt the three-dimensional model to the viewer's preferences.

Linear scaling operations on a three-dimensional model representing a three-dimensional scene are well known. An embodiment of the image display apparatus of the kind described in the opening paragraph is known from the U.S. Pat. No. 6,313,866. This image display apparatus comprises a circuit for acquiring a depth information maximum value from a first image signal. The image display apparatus further comprises a parallax control circuit to control the amount of parallax of a second image signal on the basis of depth information contained in the first and second image signals such that an image corresponding to the second image signal can be three-dimensionally displayed in front of an image corresponding to the first image signal. A three-dimensional image synthesizer synthesizes the first and second image signals which have been controlled by the parallax control circuit, on the basis of the parallax amount of each image signal, such that images correspond to that first and second image signals in the three-dimensional display space. Scaling of depth information is in principle performed by means of a linear adaptation of the depth information except for depth information which exceeds the limits of the display capabilities. These latter values are clipped.

A disadvantage of depth adaptation or scaling is that it might result in reduction of depth impression. Especially the linear depth scaling might be disadvantageous for the depth impression of the scaled three-dimensional model.

SUMMARY OF THE INVENTION

It is an object of the invention to provide a method of the kind described in the opening paragraph which results in a scaled three-dimensional model which resembles the original three-dimensional model perceptually and which has a pleasant three-dimensional impression.

The object of the invention is achieved in that the method is based on properties of human visual perception of the viewer. These properties might be a.o.:
  sensitivity to a discontinuity in the three-dimensional model in a dimension which is related with depth, i.e. in a signal representing depth; Notice that the dimension which corresponds to a viewing direction of a viewer towards the three-dimensional model equals depth.
  sensitivity to a difference of luminance values between neighboring pixels of a two-dimensional view of the three-dimensional model, i.e. amount of texture;
  sensitivity to color values of pixels of a two-dimensional view of the three-dimensional model; and
  sensitivity to a difference of particular color values between neighboring pixels of the two-dimensional view of the three-dimensional model.

The method according to the invention is based on discrimination or distinguishing between relevant parts of the information represented by the three-dimensional model for which the human visual perception is sensitive and in irrelevant parts of the information represented by the three-dimensional model for which the human visual perception is insensitive. The relevant parts should be stressed when the three-dimensional model is scaled, optionally causing an impairment or even deformation of the irrelevant parts.

An embodiment of the method according to the invention comprises a discontinuity detection step to detect a discontinuity in the three-dimensional model in the dimension which is related with depth. An aspect of linear scaling is that the geometry of the three-dimensional model can be maintained. But this is not a strong requirement for depth scaling, because humans are not very sensitive to adaptation of the amount of depth. The best proof for this is the fact that humans appreciate normal two-dimensional video which is entirely "flat". This phenomena is also discussed in the article "Just enough reality: Comfortable 3-D viewing via microstereopsis", by M. Siegel et al., in IEEE Transactions on Circuits and Systems for Video Technology, vol. 10, no. 3 pp. 387–396, 2000. Hence, the limited depth offered by e.g. linear scaled three-dimensional models still gives a three-dimensional impression. Nevertheless, humans do very well notice that in that case the three-dimensional impression is small. This is not due to the fact that absolute depth values of the scaled three-dimensional model are small, but due to the fact that the depth discontinuities. are small. In other words, linear depth scaling affects the size of the depth discontinuities, resulting in a reduced depth impression. In general, humans are very sensitive to topology of a scene and especially sensitive to depth discontinuities but less sensitive to geometry. Humans, very well observe that objects are in front of each other and e.g. partly occlude each other. However absolute depth, that means the actual distance between objects, is of less importance. This implies that even with a limited range of depth values, still a pleasant three-dimensional impression can be made as long as the topology is preserved and hence the depth discontinuities are maintained or even amplified.

Another embodiment of the method according to the invention comprises:
  a luminance contrast detection step to determine a particular luminance contrast value of a particular pixel with a neighboring pixel, with the particular pixel belonging to a two-dimensional image which is a view of the three-dimensional model; and a luminance contrast dependent scaling step to scale a depth value of an element which corresponds with the particular pixel on basis of the particular luminance contrast value.

The theory behind this embodiment will be explained by means of an example. If a white object is located in front of a white background, e.g. wall, it is hardly visible. This means that scaling depth of the scene with this white object and the white background will not substantially influence the three-dimensional impression. If there is a second, e.g. black object in the scene, then the depth scaling of the three-dimensional model of this scene should be controlled by the difference of depth between the black object and the wall. The difference in depth between the white object and the wall is not very significant for the scaling and should not or hardly be taken into account for the depth adaptation.

An embodiment of the method according to the invention comprises:

a range detection step to estimate a range of depth values in a portion of the three-dimensional model in the dimension which is related with depth; and a comparison step to compare the range of depth values with an output range of depth values.

In general, scaling is a mapping of information from an input domain to an output domain. If the ranges of the input and output values are known, the appropriate scaling can be determined. In most cases, the range of output values is known, because this range corresponds with the display capabilities of the display apparatus. However if the range of input values is unknown then this range should be determined. The advantage is that an optimal scaling can be achieved.

Modifications of the method and variations thereof may correspond to modifications and variations thereof of the scaling unit and of the image display apparatus described.

BRIEF DESCRIPTION OF THE DRAWINGS

These and other aspects of the method, of the scaling unit and of the image display apparatus according to the invention will become apparent from and will be elucidated with respect to the implementations and embodiments described hereinafter and with reference to the accompanying drawings, wherein.

Corresponding reference numerals have the same meaning in all of the Figs.

DETAILED DESCRIPTION OF THE INVENTION

There are several types of:

methods of and equipment for the acquisition or generation of three-dimensional information;

three-dimensional models for the storage of three-dimensional information;

conversions of data represented by one type of three-dimensional model into another three-dimensional model; and image display apparatus for the visualization of three-dimensional information.

First, some types of three-dimensional models will be described briefly.

Wireframes, e.g. as specified for VRML. These models comprise a structure of lines and faces.

Volumetric data-structures or voxel maps (Voxel means volume element). These volumetric data-structures comprise a three-dimensional array of elements. Each element has three dimensions and represents a value of a property. E.g. CT (Computer tomography) data is stored as a volumetric data-structure in which each element corresponds to a respective Hounsfield value.

Two-dimensional image with depth map, e.g. a two-dimensional image with RGBZ values. This means that each pixel comprises a luminance, a color and a depth value.

Image based models, e.g. stereo image pairs or multiview images. These types of images are also called light fields.

Data represented with a wireframe or a two-dimensional image with depth map can be converted by means of rendering into data represented with a volumetric data-structure or image based model.

The amount of depth which can be realized with a three-dimensional image display apparatus depends on its type:

With a volumetric display device the amount of depth is fully determined by the dimensions of the display device.

Stereo displays with e.g. glasses have a soft limit for the amount of depth which depends on the observer. Observers might become fatigued if the amount of depth is too much caused by a "conflict" between lens accommodation and mutual eye convergence.

Autostereoscopic display devices, e.g. an LCD with a lenticular screen for multiple views have a theoretical maximum depth value which is determined by the amount of views. This maximum depth value can be exceeded resulting in loss of sharpness. There is a relation between the type of three-dimensional image display apparatus and the appropriate type of three-dimensional model in which the three-dimensional information should be provided.

Figure 1A:
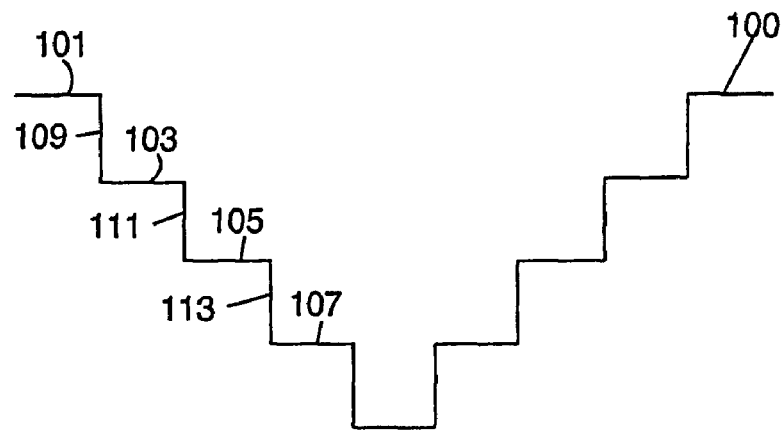
FIG. 1A schematically shows a depth profile of an original three-dimensional model.
Figure 1B:
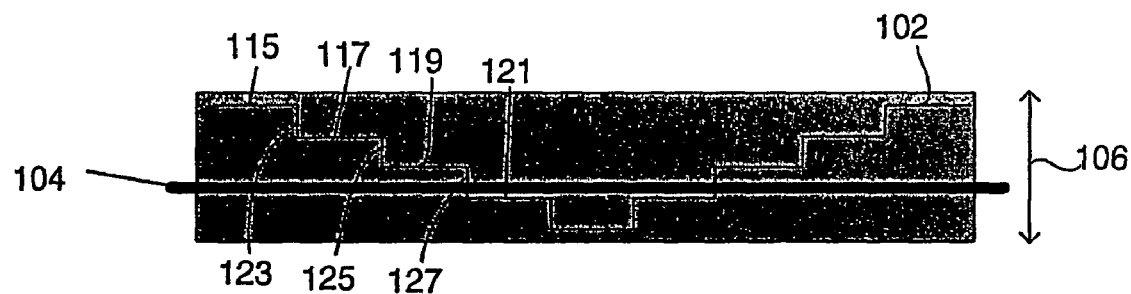
FIG. 1B schematically shows a depth profile of a linearly scaled three-dimensional model.
Figure 1C:
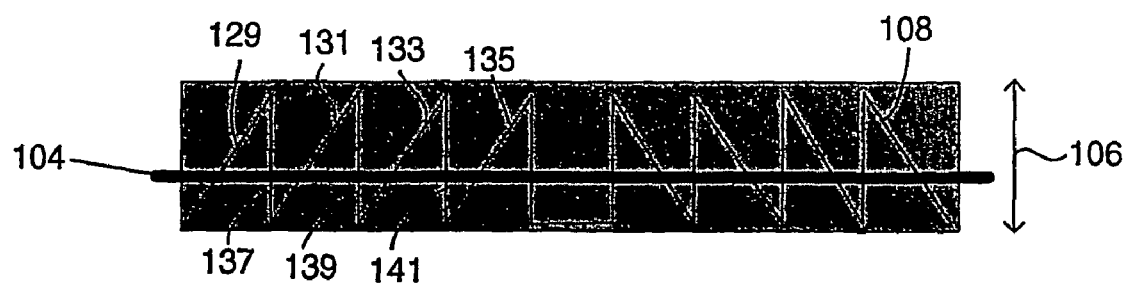
FIG. 1C schematically shows a depth profile of a three-dimensional model scaled with the method according to the invention.

FIG. 1A schematically shows a depth profile 100 of an original three-dimensional model. FIG. 1B schematically shows a depth profile 102 of the corresponding linearly scaled three-dimensional model. FIG. 1C schematically shows a depth profile 108 of a three-dimensional model scaled with the method according to the invention. In FIG. 1B and FIG. 1C a top view of a three-dimensional image display apparatus 104 is shown. The gray box indicates the depth range 106 which is applicable to this three-dimensional image display apparatus 104. This box resembles the display capabilities of the three-dimensional image display apparatus 104 in the dimension related with depth.

First, depth profile 100 is compared with depth profile 102. It can be seen that the continuous portions 101–107 are mapped to the respective continuous portions 115–121. Their shapes are not modified. That means that elements belonging to a particular continuous portion, e.g. 115 have equal depth values. The $C_0$-discontinuities 109–113 are mapped to the $C_0$-discontinuities 123–127. The sizes of the $C_0$-discontinuities 123–127 are smaller than the sizes of the $C_0$-discontinuities 109–113. Thus, the depth impression is reduced.

Next, depth profile 100 is compared with depth profile 108. It can be seen that the continuous portions 101–107 are mapped to the continuous portions 129–135. Their shapes are modified. That means that elements belonging to a particular continuous portion, e.g. 129 do not have equal depth values although these elements did have equal depth values before scaling. In fact, parallel surfaces in the original scene now have slanted orientations. The $C_0$-discontinuities 109–113 are mapped to the $C_0$-discontinuities 137–141. The sizes of the $C_0$-discontinuities 137–141 are larger than the sizes of the $C_0$-discontinuities 109–113. Note that enlargement of these sizes is not required. Although the total depth range is reduced the depth impression is increased. This is achieved by stressing the $C_0$-discontinuities 109–113. The continuous portions 101–107 are deformed on behalf of the $C_0$-discontinuities 109–113. Because humans are not very sensitive for absolute depth values these deformations are hardly perceived. And if perceived then these deformations are not annoying.

Figure 2A:
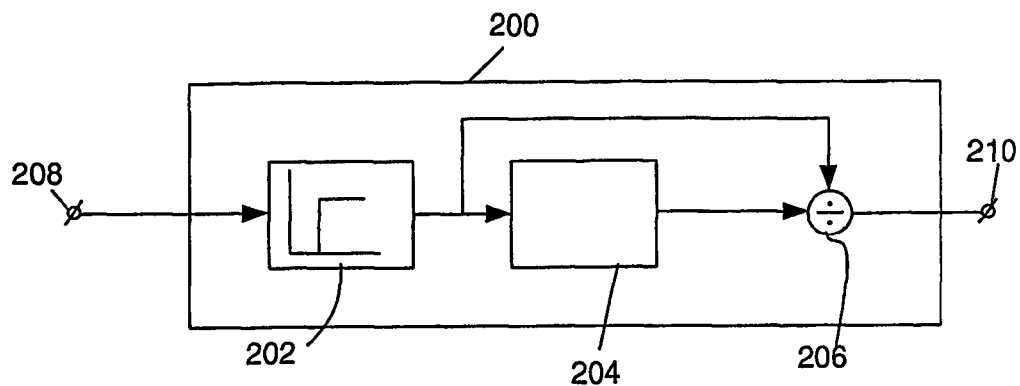
FIG. 2A schematically shows an embodiment of a scaling unit based on discontinuity preservation.

FIG. 2A schematically shows an embodiment of a scaling unit 200 based on discontinuity preservation. Especially $C_0$-discontinuities are of interest. The scaling unit 200 comprises:

- a high-pass filter 202 arranged to filter a signal corresponding to depth in order to detect discontinuities;
- an automatic gain controller 204 based on peak-detection or optionally on envelop detection to determine the input range of depth values; and
- a normalization unit 206 to adapt the filtered signal to the output range based on the input range detected by the automatic gain controller 204.

At the input connector 208 a depth signal is provided and the scaling unit 200 provides a scaled depth signal at its output connector 210. The high-pass filter 202 is arranged to discriminate between relevant portions and irrelevant portions of the signal, i.e. discontinuities and continuous portions respectively. The filtered signal is normalized by means of the normalization unit 206 based on a local maximum of the filtered signal or based on a value which is a calculated by means of a "walking average" of maximum values. The working of the scaling unit 200 as depicted in FIG. 2A is substantially equal to the working of scaling unit 201 as depicted in FIG. 2B and will be described in connection with FIG. 2B.

Figure 2B:
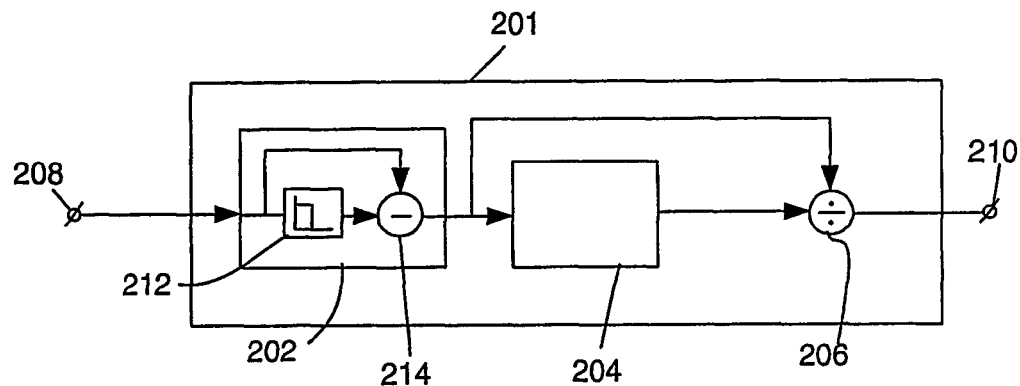
FIG. 2B schematically shows an embodiment of a scaling unit based on discontinuity preservation comprising a low-pass filter.

FIG. 2B schematically shows an embodiment of a scaling unit 201 based on discontinuity preservation comprising a low-pass filter 212 and a subtraction unit 214. In stead of using a high-pass filter 202 it is possible to apply a low-pass filter 212 in combination with a subtraction unit 214. By means of subtracting a low-pass filtered signal from an original signal the high frequency components are maintained. This embodiment of a scaling unit 201 is based on such a filtering approach. Next follows a mathematical description of this embodiment. The depth of the original scene is $D_o(x, y)$ where x and y are image coordinates. $D_o(x, y)$ can be expressed in any unit related to depth, e.g. pixel-disparity or meters. Let the unit be pixel-disparity. The scaled depth is $D_c(x, y)$ and the depth range of the three-dimensional image display apparatus on which the information will be visualized is given by $-k < D_c < k$. Notice that most three-dimensional image display apparatus have a symmetric limitation around zero depth. If this is not the case, the symmetric k limitation can be applied in combination with an addition unit which is arranged to add a pre-determined constant to the scaled signal. A typical value for k in the case of a autostereoscopic display with a lenticular screen with 9 views is 4. This follows from $k=(9-1)/2$. The scaling unit 201 can be mathematically described with:

$$D_c = k \frac{D_o - F_{\sigma_1}(D_o)}{2F_{\sigma_2}(|D_o - F_{\sigma_1}(D_o)|)} \quad (1)$$

with $F_{\sigma_1}$ and $F_{\sigma_2}$ low pass filters, e.g. Gaussian filters with variance parameters $\sigma_1$ and $\sigma_2$ equal to 50. However the type of filter or its parameters can be varied extensively. The variance parameters might be selected such that an entire depth map belonging to a complete two-dimensional image is covered. Optionally the filter comprises a temporal component in the case that filtering video data is required. A pixel-wise modulus operator is incorporated to remove the sign. The numerator of Equation 1 corresponds with discontinuity detection and the denominator corresponds with envelop detection. Applying Equation 1 on a signal as depicted in FIG. 1A results in a signal as depicted in FIG. 1C. An additional effect of the scaling unit 201 is that the depth $D_0(x, y)$ of an original scene which is less than the depth range of the three-dimensional image display apparatus will be increased. Thus any depth map $D_0(x, y)$ is scaled such that the three-dimensional effect is maximized given the capabilities of the image display apparatus.

Figure 2C:
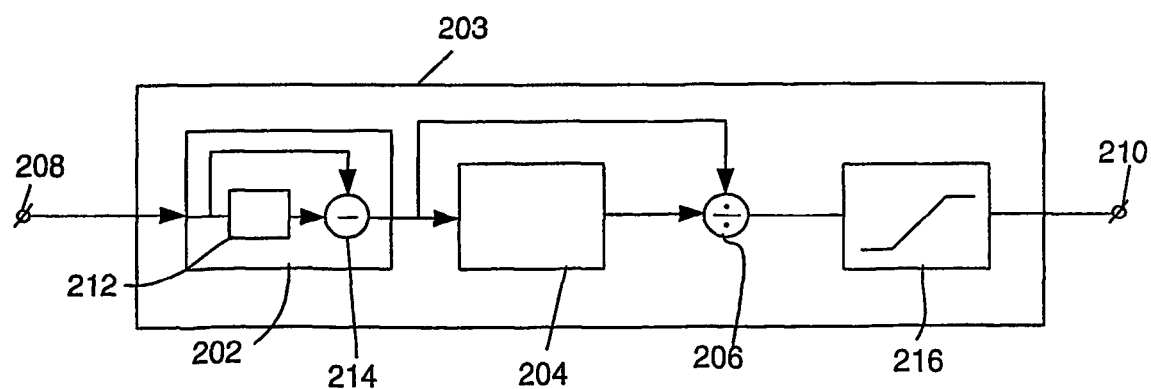
FIG. 2C schematically shows an embodiment of a scaling unit comprising a clipping unit.

FIG. 2C schematically shows an embodiment of a scaling unit 203 comprising a clipping unit 216. Applying Equation 1 might result in superceding the depth range of the three-dimensional image display apparatus. This causes a maximum overall depth effect. For some types of three-dimensional image display apparatus this is helpful, e.g. for an autostereoscopic display with a lenticular screen. Whenever superceding the depth range is really not allowed a clipping post-processing operation is performed by means of the clipping unit 216.

Figure 3:
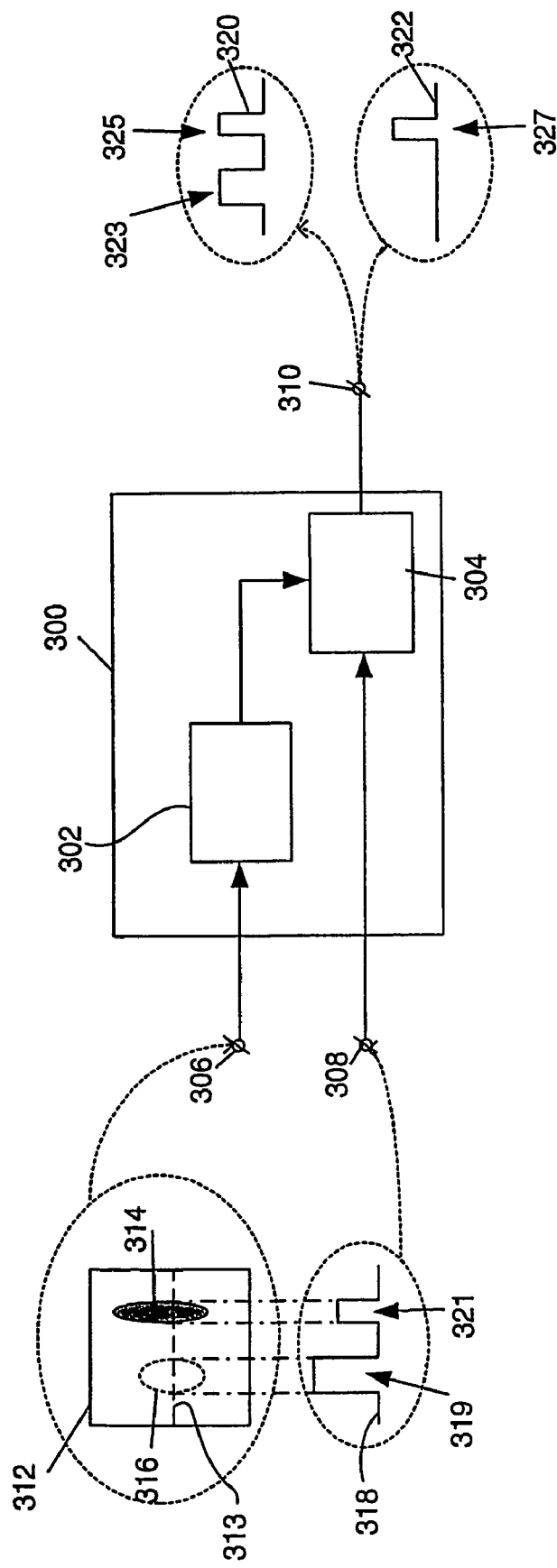
FIG. 3 schematically shows an embodiment of a scaling unit based on luminance contrast detection.

FIG. 3 schematically shows an embodiment of a scaling unit 300 based on luminance contrast detection. The scaling unit 300 comprises:

- a luminance contrast detection unit 302 arranged to determine a particular luminance contrast value of a particular pixel with a neighboring pixel, with the particular pixel belonging to a two-dimensional image 313 which is a view of the three-dimensional model; and
- luminance contrast dependent scaling means 304 arranged to scale a depth value of an element which corresponds with the particular pixel on basis of the particular luminance contrast value.

The working of the scaling unit 300 will be explained by means of an example. At the input connector 306 a two-dimensional image 312 is provided, with each pixel having a luminance value. The image 312 shows a white background. In front of the background two objects are located:

a white object 316 without texture and a grey object 314. The distance between the white object 316 and the background is bigger than the distance between the grey object 314 and the background. This can be observed by inspecting the depth profile 318 corresponding to a row 313 of pixels of the image 312. This depth profile 318 comprises two blocks 319 and 321 which correspond to the white object 316 and the grey object 314, respectively. At the input connector 308 the depth map is provided to the scaling unit. The depth map comprises a set of elements, with each element having a value representing a depth value of the corresponding pixel of the two-dimensional image 312. Because the white object 316 lacks texture and contrast with the background, this object 316 is hardly visible in the two-dimensional image 312. Hence, it is not very useful to take the depth values 319 related to the white object 316 into account when the depth map has to be scaled to e.g. the capabilities of a three-dimensional display apparatus. The opposite is true for the depth values 321 related to the grey object 314. At the output connector 310 of the scaling unit 300 the scaled depth map is provided. Depending on the settings of the scaling unit 300 the regions in the original depth map corresponding with hardly visible objects, e.g. white object 316, can be fully removed. Depth profile 322 shows only one block 327 which corresponds with the grey object 314 and no other block. With other settings of the scaling unit 300 these type of regions are not removed but adapted based on scaling which is determined by regions in the depth map which are visible, e.g. grey object 314. Scaling means 304 might be based on a scaling unit 200, 201, 203 as described in connection with FIG. 2A, FIG. 2B or FIG. 2C, respectively.

An embodiment of a scaling unit which is based on sensitivity to color substantially resembles the embodiment of the scaling unit 300 as described in connection with FIG. 3.

Figure 4:
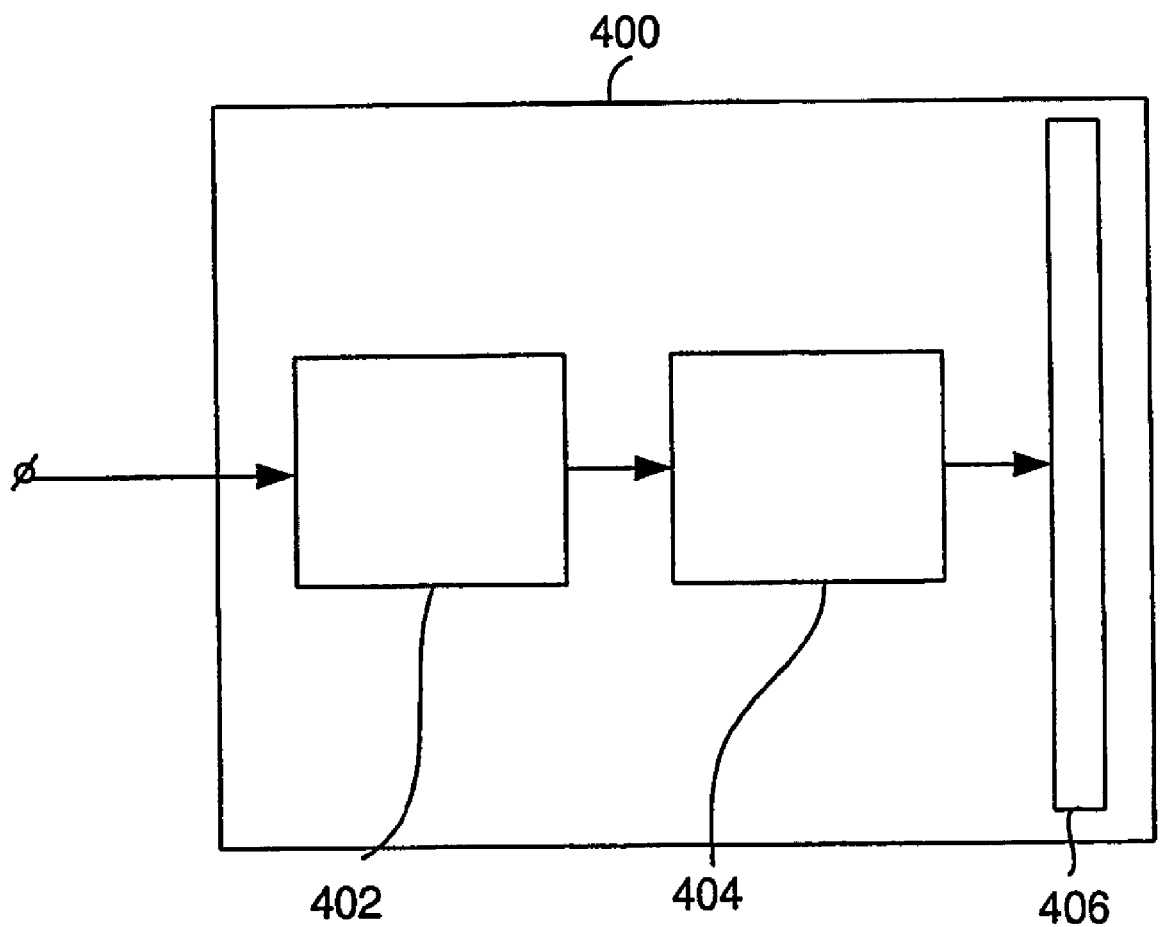
FIG. 4 schematically shows an embodiment of a three-dimensional display apparatus.

FIG. 4 schematically shows an embodiment of an image display apparatus 400 comprising:
- receiving means 402 for receiving a signal representing a three-dimensional model;
- a scaling unit 404 for scaling the three-dimensional model into a scaled three-dimensional model in a dimension which is related with depth; and
- display means 406 for visualizing of a view of the scaled three-dimensional model.

The signal can be received from a broadcaster or read from a storage medium as DVD. Optionally the receiving means 402 are arranged to convert the received information which is stored by means of a first type of three-dimensional model into another type of three-dimensional model. The scaling unit 404 corresponds to one of the scaling units as described in connection with any of the FIGS. 2A, 2B, or 3. The image display apparatus 400 can be of any of the types as listed above.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the scaling unit claims enumerating several means, several of these means can be embodied by one and the same item of hardware.

The invention claimed is:

1. A method of scaling a three-dimensional model representing a three-dimensional scene, into a scaled three-dimensional model in a dimension which corresponds to a viewing direction of a viewer towards the three-dimensional model, wherein scaling is based on properties of human visual perception of the viewer and wherein a first one of said properties of human visual perception is sensitivity to a discontinuity in the three-dimensional model in a dimension related to depth.

2. A method as claimed in claim 1, wherein a second one of said properties of human visual perception is sensitivity to a difference of luminance values between neighboring pixels of a two-dimensional view of the three-dimensional model.

3. A method as claimed in claim 1, wherein a third one of said properties of human visual perception is sensitivity to a difference of color values between neighboring pixels of a two-dimensional view of the three-dimensional model.

4. A method as claimed in claim 1, comprising:
   detecting a $C_0$-discontinuity in the three-dimensional model in the dimension which is related with depth.

5. A method of scaling a three-dimensional model representing a three-dimensional scene, into a scaled three-dimensional model in a dimension which corresponds to a viewing direction of a viewer towards the three-dimensional model, comprising:
   determining a particular luminance contrast value of a particular pixel with a neighboring pixel, with the particular pixel belonging to a two-dimensional image which is a view of the three-dimensional model; and
   scaling a depth value of an element which corresponds with the particular pixel on basis of the particular luminance contrast value,
   wherein a second one of said properties of human visual perception is sensitivity to a difference of luminance values between neighboring pixels of a two-dimensional view of the three-dimensional model.

6. A method of scaling a three-dimensional model representing a three-dimensional scene, into a scaled three-dimensional model in a dimension which corresponds to a viewing direction of a viewer towards the three-dimensional model, comprising:
   determining a particular color difference value of a particular pixel with a neighboring pixel, with the particular pixel belonging to a two-dimensional image which is a view of the three-dimensional model; and
   scaling a depth value of an element which corresponds with the particular pixel on basis of the particular color difference value,
   wherein a third one of said properties of human visual perception is sensitivity to a difference of color values between neighboring pixels of a two-dimensional view of the three-dimensional model.

7. A method as claimed in claim 1, comprising:
   estimating a range of depth values in a portion of the three-dimensional model in the dimension which is related with depth; and
   comparing the range of depth values with an output range of depth values.

8. A scaling unit for scaling a three-dimensional model into a scaled three-dimensional model in a dimension which corresponds to a viewing direction of a viewer towards the three-dimensional model, characterized in that the scaling unit is designed to scale on the basis of properties of human visual perception of the viewer wherein one of said properties of human visual perception is sensitivity to a discontinuity in the three-dimensional model in a dimension related to depth.

9. An image display apparatus comprising:
receiving means for receiving a signal representing a three-dimensional model;
a scaling unit for scaling the three-dimensional model into a scaled three-dimensional model in a dimension which corresponds to a viewing direction of a viewer towards the three-dimensional model; and
display means for visualizing a view of the scaled three-dimensional model,
wherein the scaling unit is designed to scale on the basis of properties of human visual perception of the viewer and one of said properties of human visual perception is sensitivity to a discontinuity in the three-dimensional model in a dimension related to depth.

* * * * *